March 4, 1969 E. J. HERBENAR ET AL 3,430,995
BOOT SEAL RETAINERS
Filed May 12, 1964

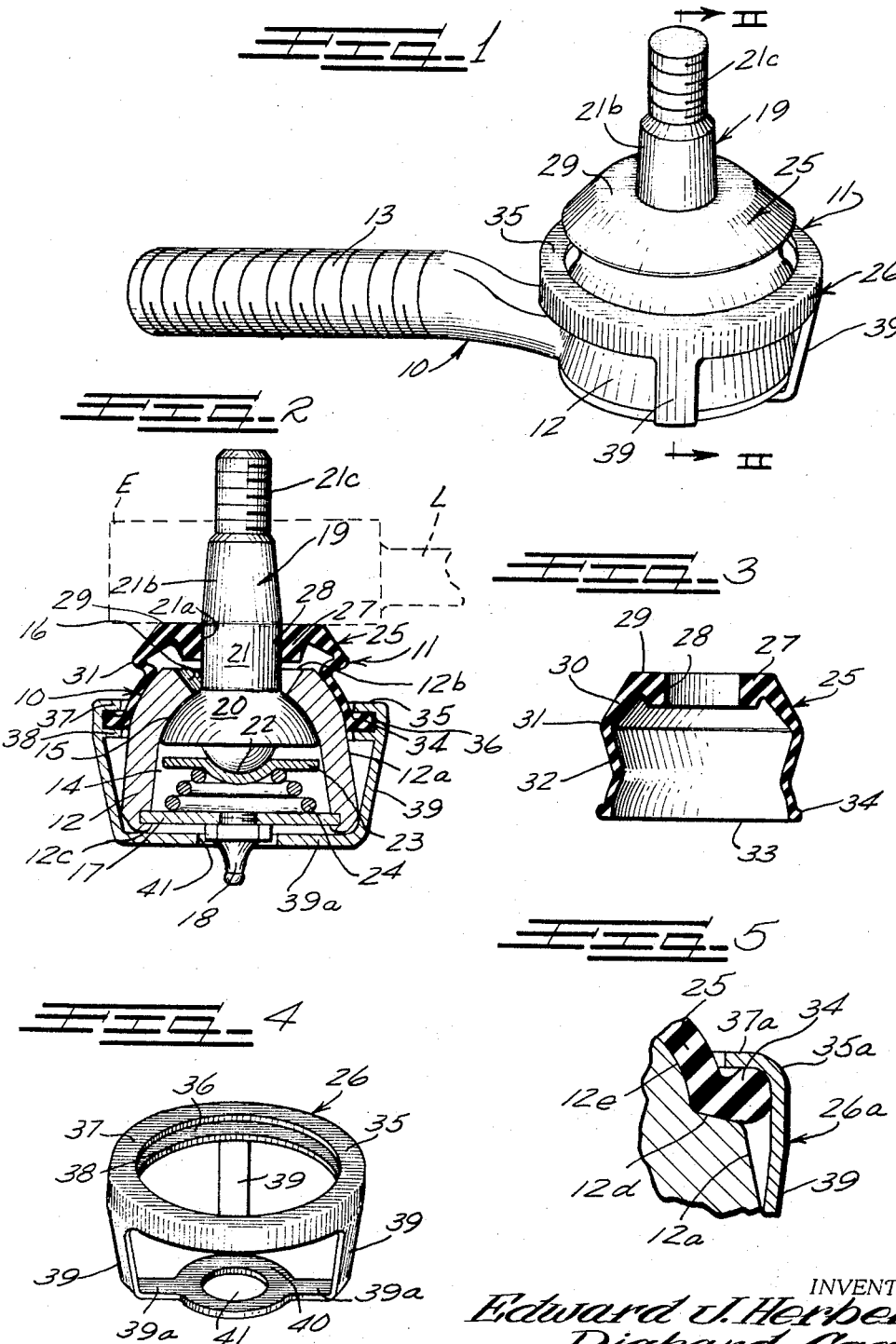

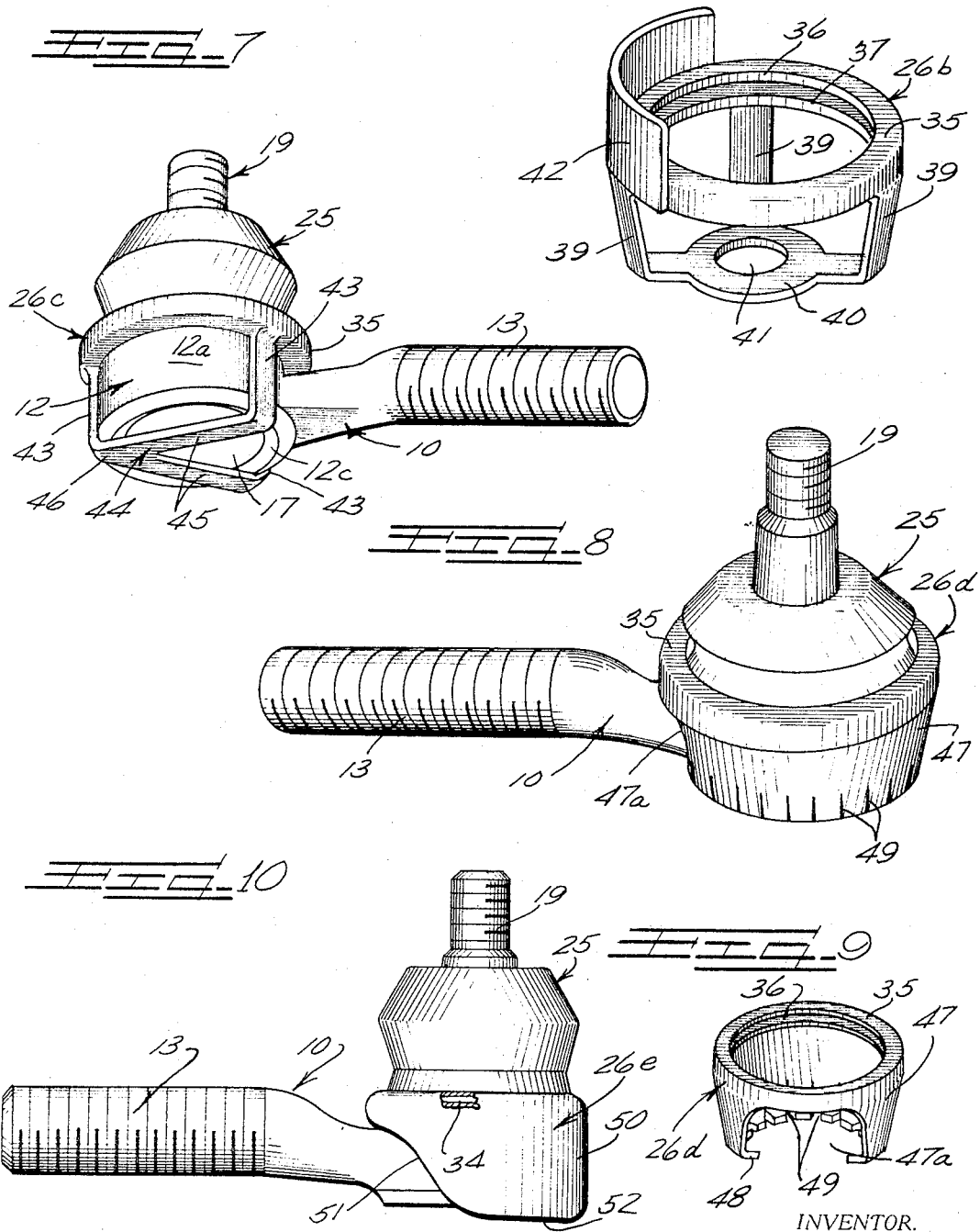

INVENTOR.
Edward J. Herbenar
Richard Cass
Eugene R. Kutcher
BY Hill, Sherman, Meroni, Gross & Simpson
ATTORNEYS United States Patent Office 3,430,995
Patented Mar. 4, 1969

3,430,995
BOOT SEAL RETAINERS
Edward J. Herbenar, Detroit, Richard Cass, Birmingham, and Eugene R. Kutcher, Warren, Mich., assignor to TRW Inc., a corporation of Ohio
Filed May 12, 1964, Ser. No. 366,846
U.S. Cl. 287—87        6 Claims
Int. Cl. F16c *11/06;* F16j *15/50*

This invention relates to boot seals and retention devices therefor. Specifically the invention deals with devices for retaining boot seals or dust caps on pivot joint housings without requiring machined or finished surfaces on the housing.

The invention will be hereinafter specifically described, in its preferred embodiment of boot seal and retainer assemblies for pivot joints such as are used in tie rod ends of automotive steering linkages, but it will be understood that the invention is not limited to any particular joint usage and has general application in any boot arrangement for sealingly connecting a plurality of relatively movable parts.

The sockets or housings of tie rod ends are conventionally forgings composed of an eye end and a laterally projected stem which is threaded into a tie rod. The eye end portion of the housing or socket has an opening through which the shank of the joint stud freely projects. The stud has a head in the housing which is tiltable and rotatable relative to the housing on bearing surfaces provided in the housing and on the head. These surfaces are lubricated and to protect against loss of lubricant and ingress of dirt, dust caps or boots sealingly connect the open end of the housing with the projecting stud shank. In order to maintain a sealing connection between the housing and such caps or boots it was heretofore necessary to machine finish a cap or boot seating surface on the housing.

The present invention now eliminates any heretofore necessary machining of tie rod end sockets for sealingly receiving a dust cap or boot and makes possible the use of exteriorly unfinished forgings for tie rod sockets.

According to this invention a dust cap or boot retainer embraces the socket engaging end of a dust cap or boot, confining this end into sealed engagement with the socket. The retainer has a harness arrangement embracing the underside of the socket to maintain the assembly on the socket. The boot or dust cap projects from the retainer and sealingly embraces the stud shank in the conventional manner. Free tilting and rotating movement of the stud relative to the socket are accommodated by relative rotation between the stud shank and boot and by flexibility of the boot.

The boot is preferably composed of elastomeric material such as oil resistant rubber while the retainer or harness can be fabricated from leather, cloth, glass, metal or synthetic plastic material.

It is then an object of this invention to provide a boot and retainer assembly for relatively movable members which is adapted to be sealingly retained on an unfinished surface such as a rough forging.

Another object of the invention is to provide a boot and retainer assembly for pivot joints and the like which does not require a machine finished surface on the joint housing.

Still another object of the invention is to provide a seal harness for a pivot joint which insures the retention of a seal on the joint housing.

A specific object of the invention is to provide an inexpensive harness retainer for boot seals.

A further object of the invention is to provide a snap-on cup-like harness for joint housings which is effective to maintain a boot seal in sealing contact with the housing.

Another object of the invention is to provide an inexpensive snap-on cup-like member for radially loading a boot seal on a pivot joint housing while simultaneously holding the boot seal against axial removal from the housing.

Other and further objects of this invention will be apparent to those skilled in this art from the following detailed descriptions of the annexed sheets of drawings which disclose several embodiments of the invention.

On the drawings:

FIGURE 1 is an isometric view of a tie rod end pivot joint having a boot seal and retainer of this invention thereon.

FIGURE 2 is a longitudinal cross sectional view generally along the line II—II of FIG. 1 and showing in dotted lines the eye end of a tie rod on the joint stud.

FIGURE 3 is a longitudinal cross sectional view through the boot seal only of the assembly of FIGS. 1 and 2 showing the boot in its free state extended position.

FIGURE 4 is an isometric view of the retainer only of the assembly of FIGS. 1 and 2.

FIGURE 5 is a fragmentary cross sectional view, on an enlarged scale, showing a preferred optional arrangement for the lip end of the boot seal.

FIGURE 6 is an isometric view of the retainer similar to FIG. 4 but illustrating an added shield on the retainer.

FIGURE 7 is an isometric view of a tie rod end pivot joint equipped with another form of boot retainer according to this invention.

FIGURE 8 is an isometric view of a tie rod end pivot joint equipped with still another form of boot retainer according to this invention.

FIGURE 9 is an isometric view of the boot retainer of FIG. 8.

FIGURE 10 is a side elevational view of a tie rod end pivot joint equipped with still another form of boot retainer according to this invention.

As shown on the drawings:

Figure 11:
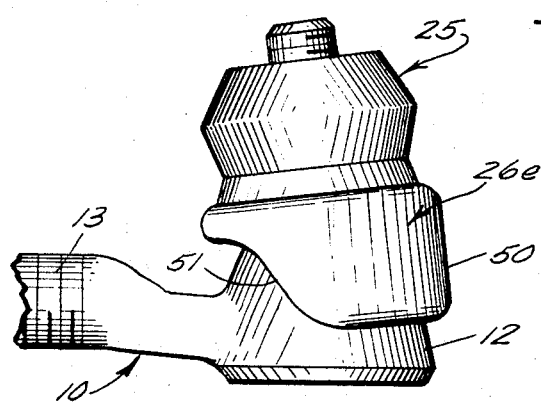
FIGURE 11 is a view similar to FIG. 10 but illustrating the manner in which a boot and retainer assembly are mounted on the socket of the joint.

In FIGS. 1 and 2 the reference numeral 10 designates generally a tie rod end pivot joint with a boot and harness assembly 11 of this invention thereon. The joint 10 includes a forged housing with an eye end socket 12 and a laterally extending externally threaded stem 13. The socket 12 defines a chamber 14 with a fragmental spherical bearing wall 15 at one end thereof converging to an opening 16. The opposite end of the chamber 14 is closed by a plate 17 which may carry a grease fitting 18 for supplying lubricant to the cavity 14. A ball stud 19 has a semi ball head 20 tiltably and rotatably mounted on the bearing wall 15 and a shank 21 projecting from the head 20 through the opening 16. The shank 21 has a straight cylindrical portion 21a extending from the head 20 to a converging tapered portion 21b which terminates in an externally threaded cylindrical end portion 21c. The tapered portion 21b is adapted to receive thereon the eye end E of a tie rod or link L or other member to be connected to the joint and a nut (not shown) threaded on the portion 21c will clamp this member onto the tapered portion.

The semi ball head 20 has a rounded button 22 depending from the central portion of the bottom thereof and seated in a dished washer 23 held thereagainst by a spring 24 bottomed on the closure plate 17.

The stem 13 of the housing is adapted to be threaded into a tie rod or the like linkage member and therefore the joint 10 will articulately connect two members one being attached to the stem 13 and the other being mounted on the stud 19.

It should be understood that the joint structure 10 is illustrative only of a pivot joint for receiving the boot and harness assembly 11 of this invention and the joint structure may be varied as desired to provide a means for connecting two linkages or the like in articuate relation.

The housing of the joint assembly 10 is a metal forging with the eye end or socket 12 having a slightly tapered side wall 12a, a flat top rim 12b surrounding the aperture 16 and a spun-in end flange 12c underlying the periphery of the closure plate. The contour of the housing may vary as desired but, in accordance with this invention, the boot and harness assembly is retained on the housing without creating any machine finished external surface for the housing.

The boot and harness assembly 11 includes a rubber boot 25, best shown in FIG. 3, and a retainer or harness 26, best shown in FIG. 4.

The boot 25 is generally tubular in shape with a thickened annular end wall 27 with a cylindrical bore 28 therethrough and a flat end face 29 thereon. A side wall or skirt portion 30 slopes outwardly and downwardly from the top of the end wall 27 to an apex 31 and then converges inwardly along a thinner wall 32 to an open bottom 33 surrounded by an external bead 34.

As illustrated in FIG. 2 the cylindrical bore 28 of the end wall 27 embraces the cylindrical shank portion 21a of the stud 19 in relatively rotatable relation while the open end 33 of the boot embraces the upper end of the side wall 12a of the socket 12 with the bead 34 surrounding the socket 12. The free axial height of the boot 25 is slightly collapsed in operation with the side wall portions 30 and 32 bowed further outwardly to extend the diameter of the apex 31. The flat end face 29 of the boot sealingly but slidably engages the bottom face of eye member E which is secured on the tapered portion 21b of the stud as is conventional. The partial collapsing of the boot 25 in assembled position on the pivot joint insures free tilting movement of the stud shank relative to the housing without pulling the end wall 27 off of the stud shank or the open end 33 off of the housing. In other words sufficient slack is available in the collapsed side walls 30 and 32 for accommodating full tilting movement of the stud. Further the stud may rotate in the boot bore 28 and the eye E may ride on the end face 29 so as not to interfere with rotation of the stud relative to the housing.

The retainer or harness 26 best shown in FIG. 4 has an annular end wall or rim 35 with an inwardly opening circumferential groove 36 therein bounded by a flat top lip 37 and a corresponding parallel bottom lip or flange 38. Three straps 39 depend from the external periphery of the rim 35 and have inturned bottom ends 39a extending to and integral with a central flat disk portion 40 having a circular aperture 41 therethrough. The straps 39 are substantially completely positioned within one half of the circumferential extent of the rim 35 so as to provide a wider space between two of the straps accommodating easy mounting of the retainer on the housing 12.

As shown in FIGS. 1 and 2 the annular end wall or rim 35 of the retainer 11 receives the bead 34 of the boot 25 snugly in the groove 36 thereof with the top and bottom flanges or lips 37 and 38 cooperating to confine the bead within the groove. As best shown in FIG. 2 the rim end 35 of the retainer or harness embraces the bead 34 and surrounds the open end of the boot to radially load this open end into sealing engagement with the side wall of the socket or housing 12. The straps 39 hold the rim 35 axially on the housing 12 by underlying the bottom of the housing with the disk portion 40 thereof bottomed on the flange 12c and surrounding the lubricant fitting 18. As illustrated in FIG. 1 the provision of a wide space between two of the straps 39 enables the rim portion 35 to be easily snapped over the portion of the boot which overlies the stem 13 and the socket end 12 is easily inserted through this space with the stem projecting about midway between the spaced apart straps 39.

In a preferred optional arrangement of FIG. 5 the upper end of the tapered socket side wall 12a is provided with a flat shoulder 12d extending radially inward to a dome top 12e and the open bottom of the boot 25 is seated on this shoulder 12d. A modified harness or retainer 26a has an annular top rim 35a equipped with only a top flange or lip 37a, the bottom flange 38 of the retainer 26 being eliminated. The retainer 26a is otherwise identical with the retainer 26. The rim 35a encompasses the bead 34 with the overlying lip or flange 39a overlying the bead to hold the open bottom of the boot sealed against the shoulder 12d.

In a further modified embodiment 26b, shown in FIG. 6, the retainer rim or end wall 35 is provided with an upturned shield 42 which, as shown, extends only around a portion of the circumference of the end wall or rim. The other structure of the retainer 26b is identical with that of the retainer 26 described hereinabove. The shield 42 gives further protection for the boot and if desired can extend completely around the circumference of the rim 35.

The retainers 26, 26a and 26b thus are easily mounted on the socket 12 of the pivot joint and are effective to hold the open end 33 of the boot both radially and axially in sealed engagement with the housing. The retainer is sufficiently flexible so that it can be easily snapped into position on the socket 12 and of course the boot is both flexible and resilient so that it is easily mounted in the retainer and on the pivot joint.

In the modification shown in FIG. 7 the same type of pivot joint 10 and boot 25 described in the assembly of FIGS. 1 and 2 are illustrated but a modified seal harness or retainer 26c is provided. This retainer has the same rim 35 as the retainer 26. However three equally spaced straps 43 depend from this rim 35. Thus the straps are disposed about 120° apart on the circumference of the rim 35. The straps 43 are joined at their bottom by a V connection 44 which has legs or sides 45 diverging to two of the straps and a base or apex 46 adjacent the third strap. This arrangement provides an easily spreadable assembly for the two straps attached to the sides 45 of the V and as illustrated in FIG. 7 the retainer 26c is slipped over the socket 12 with the straps 43 at the divergent ends of the V 45 straddling the stem 13. The retainer 26c is otherwise identical with the retainer 26.

In the assembly of FIG. 8, the pivot joint 10 has a further modified retainer or seal harness 26d thereon with the other parts being identical to those described in FIGS. 1 and 2. In the retainer 26d shown in FIGS. 8 and 9 the grooved rim top 35 of the retainer 26 is utilized and functions in the same manner as in the retainer 26, but the straps are replaced with a peripheral side wall 47 depending from the rim 35 continously therearound except for an open area 47a to span the stem 13.

The side wall 47 has an inturned bottom lip or flange 48 for embracing the bottom portion 12c of the socket 12 and the lip 48 and the adjacent area of the side wall or skirt 47 are slotted at 49 to provide an expansible and contractible bottom that can be snapped over the bottom of the socket 12. The retainer 26d is otherwise identical with the retainer 26.

Figure 12:
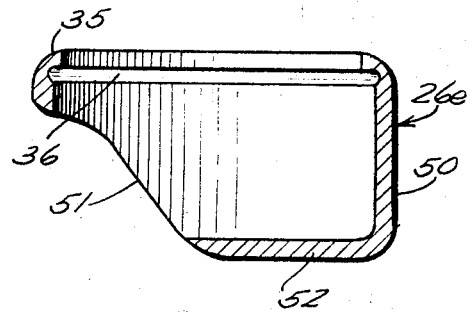
FIGURE 12 is a vertical sectional view through the boot retainer of FIGS. 10 and 11.

In the assembly of FIG. 10 a further modified retainer or seal harness 26e is provided and like the retainer 26d it has a full side wall similar to 47. However as shown in FIGS. 10 to 12 the retainer 26e has a rim top 35 with the internal groove 36 receiving the bead of the boot 25 and a cylindrical side wall 50 depending from the rim 35 around more than half of the circumference of the rim to provide a gap bounded by sloping side walls 51 straddling the stem 13 of the joint assembly 10. The cylindrical wall 50 has a bottom 52 extending to the gap. The sloping side walls 51 defining the gap extend downwardly from the rim 35 and also rearwardly so that the bottom of the gap is wider than the top of the gap and the side wall 50 extends circumferentially from a semi-cylindrical portion at the bottom area 52 thereof to a full cylindrical portion at the rim 35. The groove 36 of the rim receives the bead of the boot 25 in the same manner as described in FIGS. 1 and 2 and the boot with the retainer 26e thereon is adapted to be cocked over the pivot joint 10 as illustrated in FIG. 11 with the bottom 52 of the retainer depressed in to the retainer cavity until the retainer is brought down to the position of FIG. 10 where the bottom will snap under the housing or socket 12. Otherwise the assembly with the retainer 26e operates in the same manner as the assembly described above in connection with FIGS. 1 and 2.

Figure 13:
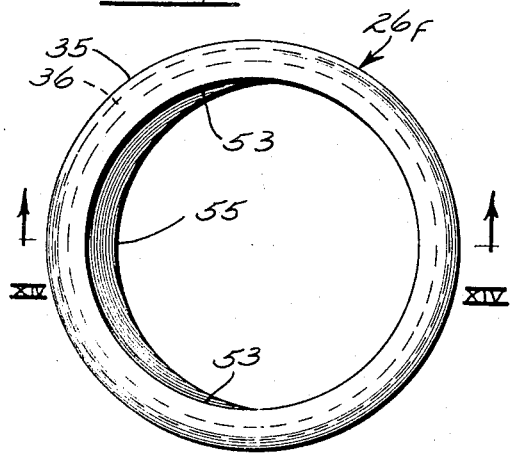
FIGURE 13 is a top plan view of boot retainer similar to the retainer of FIG. 12 with added modifications.
Figure 14:
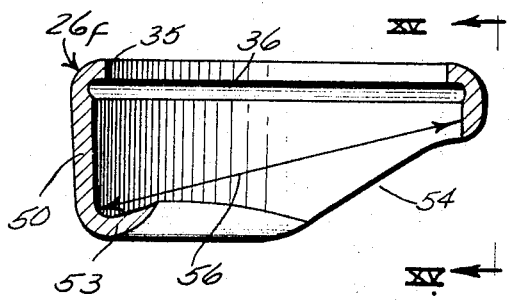
FIGURE 14 is a cross sectional view along the line XIV—XIV of FIG. 13.
Figure 15:
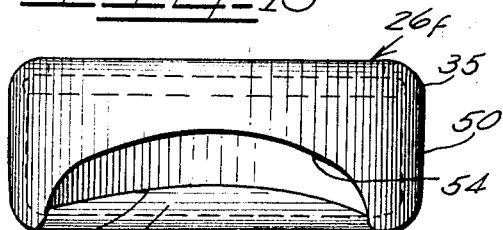
FIGURE 15 is an elevational view of the retainer taken along the line XV—XV of FIG. 14.

In the further modification of FIGS. 13 to 15 the retainer 26f is similar to the retainer 26e and corresponding parts have been marked with the same reference numerals. In the retainer 26f however there is only provided an inturned lip 53 in place of the bottom wall 52 and this lip extends inwardly around the entire circumference of the side wall 50, terminating at the gap 54 for receiving the stem of the pivot joint. The lip 53 is bowed upwardly at 55 so as to have a raised portion opposite the gap 54 and, as shown in FIG. 13, this raised portion 55 is wider than the extremities of the lip which terminate at the wide bottom of the gap 54 about half way around the circumference of the side wall 50. The raised central portion 55 of the lip provides a diagonal retention force illustrated by the line 56 in FIG. 14 tending to rock the retainer into full seated position under the socket 12 and resisting an unseating of the retainer. The retainer 26f is adapted to be cocked onto the housing or socket 12 in the manner illustrated in FIG. 11 but since the lip 53 is narrower than the bottom 52 of the retainer 26e, the retainer 26f is more easily applied with the upwardly bowed portion 55 of the lip rendering unnecessary the extended area of the bottom 52.

From the above description it will be understood that the invention provides a seal arrangement which is easily placed on articulated members without interference with free movement of the members and which is retained without the aid of specially designed surfaces on the members.

Although various minor modifications might be suggested by those versed in the art, it should be understood that we wish to embody within the scope of the patent granted hereon all such embodiments as reasonably and properly come within the scope of our contribution to the art.

We claim as our invention:

1. In combination with a pivot joint having a generally cylindrical housing with an eye and a projecting stem normal to the housing and a stud pivoted in the eye with a shank projecting from one side of the eye substantially axially of the housing and normal to the stem, a seal and retainer assembly encircling the housing which comprises a flexible tubular boot having a first end surrounding and embracing the stud shank and a second end surrounding and embracing the eye, a boot harness having a rim embracing the second end of the boot and means depending from the rim bottomed on the eye opposite said one side and straddling said stem, said rim loading said second end of the boot into tight engagement with the eye and said depending means holding the rim against axial displacement relative to the eye.

2. In combination with a tie rod end having a cup-shaped forged socket with an open top, a closed bottom, a laterally projecting stem and a stud having a head pivotally mounted in the socket and a shank extending through said open top of the socket generally axially of the socket and normal to the stem, a seal assembly for preventing ingress of contaminants and egress of lubricant from the socket which comprises an elastomeric boot having one end embracing the shank of the stud in sliding sealing engagement and an opposite end seated directly on the forged socket around the open top thereof, a cup-like retainer embracing the forged socket and straddling the stem, said retainer having a rim surrounding the opposite end of the boot and holding said opposite end in tight sealing engagement with the forged socket, and said retainer having a bottom portion underlying the socket for holding the rim against axial displacement from the socket.

3. In combination with a linkage assembly including a tie rod end having a cup-shaped forged socket with a rounded dome top surrounding an opening and a stud having a ball head tiltable and rotatable in the socket together with a shank projecting axially from said ball head freely through said opening and a link having an eye end secured on said shank of the stud with a bottom face on the eye end overlying the dome top of the socket in spaced relation, a seal and retainer assembly preventing ingress of dirt and egress of lubricant from said socket including an elastomeric tubular boot having a first end embracing the shank of the stud and the bottom face of the eye end of the link in slidable sealing relation and a second end embracing the dome top of the socket, said second end having an external bead therearound, a cup-like retainer embracing said socket having a grooved rim top receiving said bead in the groove thereof and a bottom engaging the bottom of the socket opposite said dome top for holding the grooved rim axially on the socket, and said grooved rim loading said bead radially for holding said opposite end of the boot in tight sealed engagement with the dome top of the socket.

4. A boot seal harness which comprises a flexible cup member having an open top with an internal annular groove and a depending side wall with an inturned bottom flange, and said side wall having an aperture extending around a portion of the circumference thereof adapted to straddle the stem of a socket member embraced by said harness.

5. A boot harness for joint sockets and the like which comprises a flexible cup member having an annular open top with an internal groove and a depending side wall terminating in an inturned bottom lip and said side wall having a cut-out portion converging from diametrically opposite portions of a lip to the annular rim and adapted to straddle a member extending from a housing embraced by the harness.

6. A seal harness or the like which comprises an open top cup member having an internal groove adjacent the open top, a depending side wall, and an inturned lip at the bottom of said side wall, said side wall having a cut-out portion diverging from the open top to diametrically opposite sides of the bottom lip and said bottom lip between said diametrically opposite sides being bowed upwardly to an apex intermediate said sides whereby said bowed up lip will cooperate with the rim to retain the harness on a socket.

References Cited

UNITED STATES PATENTS

| | | | |
|---|---|---|---|
| 1,431,112 | 10/1922 | Gunn | 287—90 |
| 1,871,883 | 8/1932 | Geyer. | |
| 3,208,290 | 9/1965 | Mathues et al. | 287—90 X |
| 3,226,142 | 12/1965 | Herbenar | 287—87 |
| 3,239,259 | 3/1966 | Dance et al. | 287—87 |

CARL W. TOMLIN, *Primary Examiner.*

A. V. KUNDRAT, *Assistant Examiner.*

U.S. Cl. X.R.

277—212